United States Patent
Coe et al.

(10) Patent No.: US 11,655,027 B2
(45) Date of Patent: May 23, 2023

(54) WING CARGO PARACHUTE SYSTEM UTILIZING DYNAMIC BRAKING TO REDUCE OPENING SHOCK

(71) Applicant: P.D. of Miami, Inc., Deland, FL (US)

(72) Inventors: William John Coe, Deland, FL (US); Ignatius Kapp, Debary, FL (US)

(73) Assignee: P.D. of Miami, Inc., Deland, FL (US)

( * ) Notice: Subject to any disclaimer, the term of this patent is extended or adjusted under 35 U.S.C. 154(b) by 82 days.

(21) Appl. No.: 17/461,977

(22) Filed: Aug. 30, 2021

(65) Prior Publication Data

US 2022/0063805 A1    Mar. 3, 2022

Related U.S. Application Data

(60) Provisional application No. 63/072,221, filed on Aug. 30, 2020.

(51) Int. Cl.
| | | |
|---|---|---|
| *B64D 17/34* | (2006.01) | |
| *B64C 39/02* | (2023.01) | |
| *B64D 17/18* | (2006.01) | |
| *B64D 17/24* | (2006.01) | |
| *B64D 17/36* | (2006.01) | |
| *B64D 17/62* | (2006.01) | |

(52) U.S. Cl.
CPC ............ *B64C 39/024* (2013.01); *B64D 17/18* (2013.01); *B64D 17/24* (2013.01); *B64D 17/34* (2013.01); *B64D 17/36* (2013.01); *B64D 17/62* (2013.01); *B64U 2201/10* (2023.01)

(58) Field of Classification Search
CPC . B64C 39/024; B64C 2201/141; B64D 17/18; B64D 17/24; B64D 17/34; B64D 17/36; B64D 17/62
See application file for complete search history.

(56) References Cited

U.S. PATENT DOCUMENTS

| | | | | |
|---|---|---|---|---|
| 7,648,105 | B2* | 1/2010 | Dunker | B64C 39/024 244/152 |
| 2005/0230555 | A1* | 10/2005 | Strong | B64D 1/08 244/152 |

OTHER PUBLICATIONS

Lee C K et al. "New technique for parafoil inflation control" Journal of Aircraft, American Institution of Aeronautics and Astronautics Inc, vol. 37, No. 3, May 1, 2000 4789-483, ISSN 0021-8669, United States Government (c).

Written opinion in related PCT application No. PCT/US2021/048302, Co-filed with the present application dated Aug. 30, 2021.

\* cited by examiner

*Primary Examiner* — Justin M Benedik
(74) *Attorney, Agent, or Firm* — Shalom Wertsberger; Saltamar Innovations

(57) ABSTRACT

Methods of reducing wing type parachute opening shock during a parachute drop, and parachute systems with reduced opening shocks are disclosed, the opening force reduction is achieved by dynamic braking, i.e. dynamically adjusting the canopy control lines during the inflation stage of the canopy. Typically, the control lines are set to zero brake length when the parachute canopy is released from the deployment bag, and are at least shortened during the inflation stage, optionally all the way to full brake. Optionally the control lines are also lengthened prior to completion of the canopy inflation. Other features and parachute systems are also disclosed.

26 Claims, 7 Drawing Sheets

WING CARGO PARACHUTE SYSTEM UTILIZING DYNAMIC BRAKING TO REDUCE OPENING SHOCK

RELATED APPLICATIONS

This application claims the benefit and the right of priority from U.S. Provisional Application No. 63/072,221, filed Aug. 30, 2020, which is incorporated herein by reference in its entirety, to the extent it does not conflict with the instant disclosure herein.

COPYRIGHT NOTICE

A portion of the disclosure of this Patent document, including the drawings and Appendices, contain material which is subject to copyright protection. The copyright owner has no objection to the facsimile reproduction by anyone of the Patent document or the patent disclosure as it appears in the Patent and Trademark Office patent files or records as long as clear and visible reference is made showing the applicant, patent or patent publication number, but otherwise reserves all copyright rights whatsoever.

FIELD OF THE INVENTION

Versions and embodiments of the present invention relate generally to parachuting systems and more particularly to an apparatus, methods and systems for controlled deployment of the parachute for reducing opening shock commonly experienced at opening of the parachute.

BACKGROUND

The following is not deemed to be admitted prior art but general information on related art. A cargo parachute system is designed to deliver a cargo from an aircraft to the ground while limiting the ground impact velocity to a level which will protect the cargo from being damaged. The cargo parachute system mission comprises a parachute canopy which is initially stored in a special container named a deployment bag. The canopy is packed into the deployment bag following a procedure designed to optimize opening thereof once deployed, as well as to control certain aspects of the inflation of the canopy. Groups of the suspension lines are connected from the canopy to straps called risers. The risers may be connected directly to the cargo but more commonly are connected via certain intermediate members. Oftentimes the risers are connected to an intermediate load attachment platform and the cargo payload itself is then coupled to the intermediate load attachment platform (equivalently related merely as 'platform' in this specifications), either directly or indirectly.

The combination of cargo payload and the coupled cargo parachute system is referred to as a parachuted assembly or simply as the assembly. Examples provided in this specification shall assume a parachuted assembly utilizing a platform in a non-limiting way. The skilled person would readily realize that the teachings provided in this specification may be applied to a parachuted assembly which does not utilize a platform as well.

Common parachutes may be roughly divided to drag parachutes and wing parachutes. Drag parachutes are commonly round or cross shaped. While drag parachutes reduce the load drop by introducing sufficient drag to slow the assembly's fall, when a wing parachute is deployed its canopy forms an inflated wing with an airfoil which generates lift. Wing parachutes are also known as hi-glide parachutes and more colloquially as ram air parachutes.

FIG. 1 depicts a schematic diagram of a version of a wing type parachute canopy 1. To facilitate orientational references, an arrow marked CW (chord width) is directed generally along the cord dimension of the parachute, with arrowhead F indicating the approximate forward or front direction of the canopy, while the arrow tail indicates generally the canopy rearward direction. The arrow marked SW (span width) is directed generally along the span dimension, with left and right indicated at the respective edges of the SW arrow.

The canopy 1 comprises a plurality of connected cells, 3A-3D. The wing canopy is commonly formed of a pliable membrane, such as non-porous fabric (zero-porosity nylon). Each of the cells 3A-3D is bounded by a top skin 5, and a bottom skin 9 coupled by two ribs 7 respectively. Inter-cell ribs are commonly shared between adjacent cells. Operationally, the top and bottom skins do not meet at the front edge, leaving a cell opening 10 which allow air to inflate the cells during canopy deployment and keep them inflated in forward flight movement. In some canopies internal openings known as "cross-ports" are provided between cells in order to facilitate the inflation of adjacent cells from cells that are more inflated than their neighboring cells. While the figure depicts a canopy having only four cells, the number of cells may be smaller or larger as required.

FIG. 2 depicts a simplified fully inflated cross section of the canopy at an exemplary rib, and showing certain lines attached thereto. Operationally, due to a combination of vertical and horizontal movement of the canopy, air enters the openings 10 and inflates the canopy into a wing shape. The top skin 5 and the bottom skin 9 form the wing, while the airfoil shape is controlled by the rib 7 shape. The wing has a leading edge 12 and a trailing edge 15. The dashed-dot line 20 extending cord-wise between the leading edge and the trailing edge is known as the cord line. In common parachuting parlance the leading edge 12 region is referred to as the nose, and the trailing edge 15 region is referred to as the tail. The nose of the canopy is directed in the forward direction while the tail of the canopy is directed rearwards.

A plurality of suspension lines 25 are connected to the canopy bottom side. The suspension lines extend between the canopy and the risers 35, between the canopy and the platform, or between the canopy and the payload itself. The suspension lines are commonly named alphabetically beginning with line A at the front of the canopy and extending in ascending order towards the rear of the canopy. In FIG. 2 lines A-F are visible (with only lines A and F marked), however the number of lines used is a matter of mission specific parameters. Furthermore, in theses specification references to the F suspension line should be construed as referring to the rearmost suspension line in the canopy, rather than specifically to the F line as depicted. Suspension lines farther aft of the nose may be increasingly longer, so as to set a parachute descending at full-glide in a nose-downward angle at an angle α known as a rake angle.

A special set of lines known as control lines 30 are coupled to the tail of the canopy further aft of the F suspension line and are used to control the direction of flight and/or to slow the parachute forward motion by modifying the airfoil shape. The control lines 30 are equivalently known as steering lines and/or brake lines. In some versions the control lines are coupled to the tail of one or more of the spanwise outer cells on the right and left sides of the canopy, and are not connected to the tails of the center cell(s). The outermost cell or cells which have control lines coupled to their tails are referred to as end cells in these specifications, while cells disposed between the right and left end cells are referred to as center cells. It is noted that the term end cell may relate to any desired number of cells to which control lines are coupled. Especially in high load cargo parachutes a plurality of end cells are used on each side, the number of end cells is a matter of mission specific parameters, as long as at least one center cell remains between the left and right end cells. Thus, the term cell(s) may be used equivalently in singular or plural form in the context of cell groups such as end, intermediate, and center cells.

During stable descent the tails of the center cells maintain their position by the above-ambient air pressure in the center cells, as well as by the spanwise tension of the outer cells. Generally, in full glide the center cells tend to maintain the cell profile similar to the rib profile. The end cells profiles are influenced by the tension that is applied to their tails by the control lines, in combination with their respective ribs shape.

The effective length of a control line is the length of line between a reference point such as an actuator and/or pulley, and the trailing edge of the respective cell to which the control line couples, measured while the canopy is inflated during descent and the respective control line is in tension. The effective length may be a straight-line distance between the trailing edge of the respective cell and the actuator, or greater if intermediate objects are used in the parachute system. By way of example such intermediate objects may pullies, spools, sliding anchors such as rings, holes, arms, and the like. Such intermediate objects may be utilized for routing a control line, gaining mechanical advantage, and the like. For brevity when relating to the control lines, the term 'effective length' may equivalently be abbreviated to merely 'length', and the terms "lengthen" and "shorten" in reference to the control lines should be construed to lengthen and shorten the effective length of the line, respectively.

A common problem in the field of parachuting and most pronouncedly in high-load cargo wing parachute systems is managing the heavy shock energy caused when the parachute of such system opens. In a wing parachute, inflation causes drag and lift which opposes the gravitational pull on the assembly as a whole. The sudden introduction of drag and lift, on the falling assembly imparts heavy stresses to the parachute, connecting lines and bridles, the payload cargo, and other optional portions of the system such as actuating and navigation systems. Sudden opening may impart heavy G-loads on the payload, and sometimes causes the payload to oscillate violently further exacerbating potential payload damage. The stresses caused by the parachute opening on various portion of the parachute system and cargo are commonly referred to as "opening shock". Several factors determine the magnitude of the opening shock, amongst which the total system weight supported by the parachute, the shape and structure of the parachute, velocity during the opening, air pressure, temperature, and the like. The opening and inflation speed is of-course a major factor on the magnitude and duration of the opening shock. The opening and inflation speed may be influenced by the manner at which the parachute is packed.

Several methods have been devised over time for reducing the opening shock. Most common amongst those methods is called a slider 37. In wing parachutes the slider is a square or rectangular piece of cloth with a plurality of grommets disposed therein. The suspension lines are bunched into groups and each group is passed through a respective grommet. During parachute packing, the slider is moved up along the suspension line groups to the parachute canopy. At initial deployment, the slider keeps the canopy from opening too quickly and reduces the initial shock. The spreading action of the inflating canopy forces the slider down the suspension lines, delaying and controlling the canopy inflation. However, the slider action alone is in many cases insufficient to reduce the opening shock to acceptable levels, and in certain cases the slider descent along the suspension lines is unpredictable. As FIG. 2 depicts a parachute that is fully open, full-glide state, the slider 37 is depicted in its downward position.

Common operation sequence of a cargo parachuting mission will now be described in relation to a parachuted assembly which uses a payload coupled to an optional intermediate platform, a parachute coupled to the platform, and an optional drogue parachute. The drop sequence begins by dropping the parachuted assembly of payload and parachute system from an aircraft. After a free-fall stage in which the assembly falls through the air, deployment of the parachute system is initiated, commonly by a line coupled to the aircraft. A small parachute known as a pilot chute is first deployed which may deploy a drogue or the main canopy. If a drogue is used, the drag induced thereby controls the velocity of the falling assembly and stabilize it into a primarily vertical fall. This optional stage is referred to as the drogue fall stage. Upon reaching a specified altitude, time in drogue fall, or fulfillment of another predetermined condition, the parachute deployment stage begins when the deployment bag is detached from the cargo or platform, and extends away from the cargo while drawing with it the suspension lines. Once the suspension lines are substantially fully extended the deployment bag opens and the parachute canopy is released into the air and starts to inflate. The time interval from the instant the canopy is released from the confines of the deployment bag and the time when the canopy is first fully inflated is referred to in these specifications as the inflation stage. After the parachute canopy is fully inflated, the assembly reaches a stable descent stage, equivalently referred to as full glide mode, until the cargo reaches the ground (which may equivalently be a body of water). FIG. 2 is a simplified side view of a canopy and suspension and control lines in a typical full glide mode. For clarity, the term full glide refers to a descent of a parachuted assembly under fully inflated canopy without the effects of steering and/or braking.

When the canopy is released from the deployment bag it is exposed to high velocity air movement caused by the downward movement of the parachute assembly, and if deployed shortly after leaving an aircraft, the forward speed of the aircraft. Due to the exposure to the dynamic turbulence imparted by the high velocity air stream the canopy inflation process is neither instantaneous nor linear. During the initial period of the inflation stage, colloquially known as the snivel stage, the canopy movement is chaotic. At the beginning of the inflation stage the canopy begins to unfurl and expand, and then gradually inflates. The cells begin to inflate and expand cord-wise first. Inter-cell openings known as cross ports assist spreading the air between the cells, facilitating the cord-wise expansion of the individual cells and the spanwise expansion of the canopy as a whole, to the shape of the wing. Thus, the canopy generally expands cord-wise faster than spanwise, and oftentimes the center cells of the span fill faster than the end cells. Initially the canopy spanwise spread is limited by the slider 37 but the slider is forced downwards by the canopy spread, and as it slides down the suspension lines it gradually allows further expansion of the canopy. As the canopy fills with air, the oscillations subside, the canopy attains the wing shape and transitions to full glide mode.

FIG. 3A depicts schematically a simplified cross section of the canopy airfoil during typical full-glide mode with a simplified airflow depiction over its top skin. The relative wind is marked generally by the arrow marked RW, while the schematic flow over the wing is marked by the light arrows. Ideally, during full glide air generally flows along the top skin of the wing in mostly laminar fashion, forming layers of flow which generally follow smooth paths with the layer closest to the top of the wing being substantially parallel thereto. In these specifications a cell in such substantially laminar flow, without tail deflection, is said to be in full glide, or neutral state.

When the canopy is at full glide with an airfoil as shown in FIG. 3A, the parachute is in a state commonly known in parachuting parlance as "zero brake" state. The effective length of the respective control line 30 controlling the local airfoil in zero brake state is said to be zero brake length. Stated differently, in zero brake length, the control lines 30 length is dimensioned and/or tensioned to maintain the tail of the respective cell in zero brake state, i.e. in full glide mode during fully inflated parachute descent.

Shortening the control lines 30 beyond the zero brake length is used to affect turns and/or reduce the parachute forward speed during flight mode. FIG. 3B depicts a simplified cross section of an end cell airfoil when moderate tension is applied to the trailing edge by shortening the respective control line. The applied tension causes downwards deflection of the tail and distorts the local airfoil causing a separation of the laminar flow about the separation point SP. The air behind the separation point SP becomes turbulent and does not contribute to lift. Furthermore, the downward bent section of the airfoil increases drag, thus acting as a brake. Further shortening of the control lines 30 causes the separation point SP to move further forward, as shown by way of example in FIG. 3C, and may continue even further to a point, shown schematically in FIG. 3D, where the wing does not generate any significant lift and is said to be stalled. The control line length which allows the wing to generate sufficient lift just before the stall, is known in parachuting parlance as "full flare" or equivalently as "full brake" length. Further shortening of the control lines beyond full brake length could cause a canopy or a portion thereof to stall and effectively cease to generate lift.

It may be helpful to relate to different lengths of the control lines by their "braking" effect, in terms of 'percent brake'. When the control line length is set in a manner that would cause the respective inflated cell to be in zero brake state the control line length is said to be in zero (0%) brake length. In contrast when the control line length is set to bring the tail of the respective cell to full brake state, the control line effective length is said to be at full brake (100%) length. Intermediate brake settings may then be expressed in terms of percent brake and the control line length correspond to the brake level. It is important to realize that the setting the control line length to a given brake state does not imply that the respective cell is set to such brake state, but merely implies that the control line length setting would cause the cell to be in such brake state if the canopy was in fully-inflated, stable descent mode. Therefore, by way of example, the control line length may be set to 40% brake on the ground, however the respective cell would only attain 40% brake state while being fully inflated in stable descent. The actual effective length associated with a respective percentage of brake is of-course dependent on the canopy and the specific rigging of the parachuted assembly.

The chord line of the airfoil in unbraked, full glide mode is replicated by the dashed-dotted line 20 in FIGS. 3A-3D for reference purposes, to facilitate comparison between the various brake states of the respective cells as depicted in FIGS. 3A-3D and to more clearly depict the venting effect depicted in FIG. 4.

In the prior art it is common practice to preset the control lines 30 lengths to about 50% brake during packing of the parachute prior to the drop. Such length would cause the tail of the attached cells to deflect half-way between full glide and full flare after the canopy inflates, and would tend to maintain the tail lower during the inflation process, causing air to be scooped under the respective cell. In the prior art the control lines length is lengthened to zero brakes only after the parachute inflation is substantially complete. After the canopy is fully open the trailing edge of the respective cell is allowed to gain the zero brake state, and steering and/or braking of the parachute are resumed as needed.

Regardless of the optional use of drogue and/or slider, and especially with high load cargo parachuting systems, reducing the parachute opening shock remains a challenging task which tend to limit the weight of the cargo package or increase the likelihood that the cargo is damaged during the high G loads of canopy opening. Thus, there is an ongoing and heretofore unmet need for reliable methods and systems which limits the opening shock in cargo parachuting systems to avoid payload damage, and such solutions are disclosed herein.

SUMMARY

It is an object of certain aspects of the present invention to provide a mechanism for controlling the airfoil shape of at least some parts of the canopy so as to control aspects of inflation of the canopy during deployment.

It is again noted that in the prior art the deployment of a cargo parachute system is done with the control lines preset to some positive brake level, which is maintained until the parachute is fully inflated. Most commonly the length of the control line(s) is statically set to achieve about 50% brake position during canopy inflation.

The inventors discovered unexpected results where, contrary to common wisdom in the parachuting art, dynamically modifying the brake level during the inflation period can significantly reduce the opening shock. In stark contrast with the common practice, in certain embodiments of the present invention the parachute is initially deployed with substantially zero brake line length. However, during the inflation period the control lines length is shortened from zero brake to a first predetermined brake length. In certain embodiments the control lines are then lengthened to a second brake length. At the earlier stages of the inflation, when the parachute had yet to achieve its full span, holding the end cells at zero brake allows the tail portion of the center cells to deflect upwards from the neutral airfoil shape depicted in FIG. 3A. Such upward deflection is shown schematically in FIG. 4, where the trailing edge 15 of the center cells extends upwardly from its position in the zero brake, full glide shape. Such upward deflection of the center cells causes a venting effect which allows air to escape from under the bottom skin of the canopy. The venting effect reduces the drag produced by the canopy. The dot-dashed cord line 20 at zero brake is replicated in FIG. 4 to more clearly show the upward deflection. The deflection level depicted in FIG. 4 is provided by way of example and various upward deflections may occur in differing deployment stages and/or missions.

A basic concept of the invention involves dynamic braking. When related to the present disclosure the term dynamic braking relates to dynamically modifying the brake lengths of the control lines during the canopy inflation stage, to manipulate the canopy inflation process. Dynamic braking involves at least one modification of the control lines brake length, however it may also involve a plurality of brake length modifications, which may include repeated steps of shortening and/or lengthening, cyclical or at discrete length modifications, similar or differing lengths, and may include pauses between successive length modifications. Notably, modifying the brake lengths at other times during the parachute drop, whether for braking or steering is also permitted but should not be confused with the dynamic braking which occurs during the canopy inflation period. The dynamic modification of the brake lengths assists in manipulating the parachute opening manner, which in turn modifies the opening shock characteristics imparted by the canopy opening to the cargo and/or other system components.

In an exemplary embodiment the assembly is dropped from the aircraft and the canopy control lines 30 are set at substantially zero brake length during an initial portion of the inflation stage as the canopy is released from the deployment bag. When the control line length is set to an initial brake length such as zero brake length, and prior to full canopy inflation the trailing edge of at least one of the center cells of the canopy is allowed to deflect upwardly of the neutral, full glide trailing edge position. After a certain delay from the canopy release from the deployment bag, the control line(s) are shortened to a predetermined first brake level, during the canopy inflation period. After the control lines are shortened to the first brake length, and oftentimes while still being in the inflation period, the control lines are lengthened back to a second brake length. In some embodiments the control lines are first shortened to the first brake level, held at the first brake level during a pause period and lengthened to the second brake length after the pause period. In some embodiments, a plurality of cycles of shortening and lengthening of the control lines during the canopy inflation stage, with or without the optional pause therebetween, may be utilized. The first and second effective lengths of the control lines may optionally be modified between such cycles. It is important to note that the chaotic nature of the inflation may effect the respective cell tail position, and that minor differences from the precise terms zero brake, full brake, and any value therebetween encompasses minor variations from the precise line length required to achieve such position.

Therefore, in an aspect of the invention there is provided a method of parachuting cargo utilizing a parachute system operationally having a flexible wing shaped canopy, the canopy having a plurality of laterally arranged ram air inflated cells extending from a leading edge to a trailing edge and forming an airfoil, the canopy having a plurality of suspension lines and at least a left and right control line configured to controllably modify the airfoil shape of one or more respective left and right end cells, the control lines effective length being controllable by an actuator at a range at least between zero brake (0%) length and full brake (100%) length. The method comprising dropping the parachuted system from a delivery aircraft with the canopy packed in a deployment bag; releasing the canopy from the deployment bag to initiate the canopy inflation the control lines length being at an initial brake length, such as substantially at 0% brake length by way of example, at the time of releasing the canopy; and utilizing the actuator, shortening the effective length of the control lines from zero brake length to a pre-determined first brake length during the canopy inflation period. The canopy inflation period begins after the step of releasing the canopy from the deployment bag, and ending upon full inflation of the canopy.

Optionally, a pause between the shortening and the lengthening of the control lines is utilized.

Optionally, the method may further comprise lengthening the control lines to a second brake length after the shortening step and during the canopy inflation period.

In some embodiments the parachute system comprises a controller configured to control the actuator, and at least one sensor, the at least one sensor being in data communication with the controller. The method further comprises the step of sensing by the sensor at least one parameter relating to the status of the parachute system, and utilizing the sensed parameter for controlling the control lines so as to maintain the canopy at or about pre-stalled condition during at least a portion of the canopy inflation period. The at least one parameter may be selected from angle of attack, air velocity, altitude, canopy shape, canopy distortion, G force, lateral velocity, canopy stress, air pressure, and any combination thereof. Optionally the canopy may be kept at pre-stalled condition utilizing a time schedule.

Notably minor variations of the initial brake length, zero brake length, full brake length, the first brake length, the duration of the pause period if utilized, fall within the scope of the invention and the claims. Minor variations are considered such that will not adversely effect the desired function of reducing the opening shock by dynamic modification of the brake state of the canopy during the inflation stage. By way of example, in certain embodiments the control lines are utilized to trigger the beginning of the canopy deployment, which may cause minor variation of an initial setting of the control line brake length of zero brake, prior to the release of the canopy from the deployment bag.

In certain embodiments the method further comprises performing a plurality of cycles after the step of lengthening, each cycle comprising a shortening and a lengthening of at least one of the left and right control lines, at least one cycle occurring during the canopy inflation period. Notably even a single shortening of the control lines, followed by the lengthening and again by shortening during the inflation period should be construed as repeating the cycle, and varying levels of the shortening and lengthening between such cycles also fall within the scope of the invention.

Optionally the step of shortening begins after a preselected initial delay following the release of the parachute from the deployment bag.

In some embodiments the first brake length may be between 5% brake length and 50% brake length, and in other embodiments the first brake length is between 50%-99% brake length. In some embodiments the first brake length may be 100% of the full brake length. In some embodiments the second brake length may be between 5% and 50%, and in some embodiments the second brake length may be between 5% and 0% brake length. Notably in embodiments where the initial brake length is zero brake length, such length may be open to minor variations, however the first brake length would be shorter than the initial brake length set at the release of the canopy from the deployment bag.

In another aspect of the invention there is provided a cargo parachute system with reduced parachute opening shock the cargo parachute system comprising an inflatable wing-parachute canopy, operationally having a span and a substantially orthogonal cord, the canopy comprising at least three spanwise coupled cells, forming at least one center cell at least one left end cell and at least one right end cell, the respective end cells disposed respectively on opposing sides of the at least one center cell, each cell of the at least three cells having a leading edge and a trailing edge, an actuator, a right control line coupled between the actuator and the trailing edge of at least one right end cell and a left control line coupled between the actuator and trailing edge of at least one left end cell. The actuator is constructed to dynamically control the effective length of the left and/or right control lines between lengths corresponding to zero brake state and full brake state respectively. A controller is coupled to the actuator, the controller being configured to operationally control the actuator to shorten the effective length of at least one of the left and right control lines to a pre-determined first brake length during the canopy inflation period.

Optionally, the controller comprises a guidance system. Further optionally, the guidance system comprises a navigation guidance system. Optionally the controller is being configured to control the actuator to operationally lengthen the effective length of at least one of the control lines to a pre-determined second brake length during the inflation stage of the canopy, wherein the lengthening occurs subsequent to the shortening. In certain embodiments the controller is configured to operationally pause between the shortening and the lengthening during the inflation stage of the canopy. In some embodiments the shortening and lengthening of the control line may be controlled in accordance with a predetermined time schedule.

Optionally, the controller and the actuator are integrated. The system may comprise an Autonomous Guidance Unit (AGU) wherein the controller, the actuator and a guidance system are integrated within the AGU.

Optionally, the system further comprises at least one sensor in data communication with the controller, and wherein the controller is configured to control the length of at least one of the control lines in response to data received from the sensor. The sensor may be selected from an angle of attack sensor, an air velocity sensor, an altitude sensor, a canopy shape sensor, a canopy distortion sensor, a G force sensor, a lateral velocity sensor, a canopy stress sensor, an air pressure sensor, and any combination thereof. Optionally the sensor comprises a camera operationally aimed at the canopy, as such camera may allow estimating the state of the canopy, and how far the canopy is from stalling. Such embodiment shall utilize artificial intelligence to dynamically modify the canopy brake level, to reduce the opening shock as well as optionally to obtain mission dependent descent profile.

Optionally, the controller is configured to cyclically shorten and lengthen the control lines during the inflation stage of the canopy. The cycle(s) may occur in accordance to a timing schedule, in accordance with input from the sensor(s), the guidance system and any combination thereof.

In accordance with a more generalized aspect of the invention, there is provided a method of parachuting cargo utilizing a parachute system as described above, the method comprising dropping the parachuted system from a delivery aircraft with the canopy packed in a deployment bag, releasing the canopy from the deployment bag to initiate the canopy inflation stage, and utilizing the actuator, dynamically modifying the control lines effective length during an inflation time period, the inflation time period begins after the step of releasing the canopy from the deployment bag and ends upon full inflation of the canopy. Optionally a sensor as described above may be utilized to decide on the dynamical controlling of brake lengths of the control lines.

Stated differently, the method comprises applying dynamic braking to the control lines during at least a portion of the canopy inflation period.

The guidance system may be a navigation system or a remote-control system to guide the parachute system to a desired path. Optionally, the navigation system is a satellite-based navigation system, a radio-based navigation system, laser-based navigation system, artificial vision-based navigation system, Inertial Navigation System (INS) or other suitable navigation system. Optionally activation of the actuator is controlled by the guidance system. Further optionally in certain embodiments the guidance system or a portion thereof comprises the actuator.

Optionally, the first and second control lines are joined at a distance from their respective end cells.

BRIEF DESCRIPTION OF THE DRAWINGS

Some embodiments of the invention are described herein with reference to the accompanying drawings. The description, together with the figures, enables and makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures are not to scale. Understanding that these drawings depict only typical embodiments of the invention and are not therefore to be considered to be limiting of its scope, the invention will be described and explained with additional specificity and detail through the use of the accompanying drawings in which.

Figure 1:
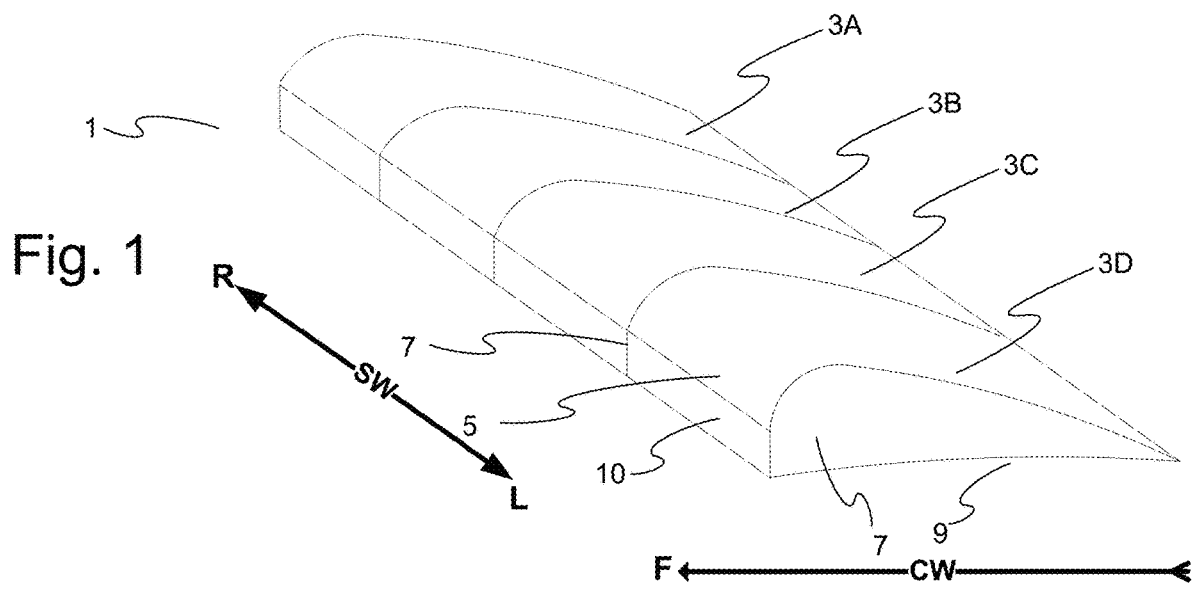
FIG. 1 depicts schematically a simplified perspective view of a wing parachute canopy.
Figure 2:
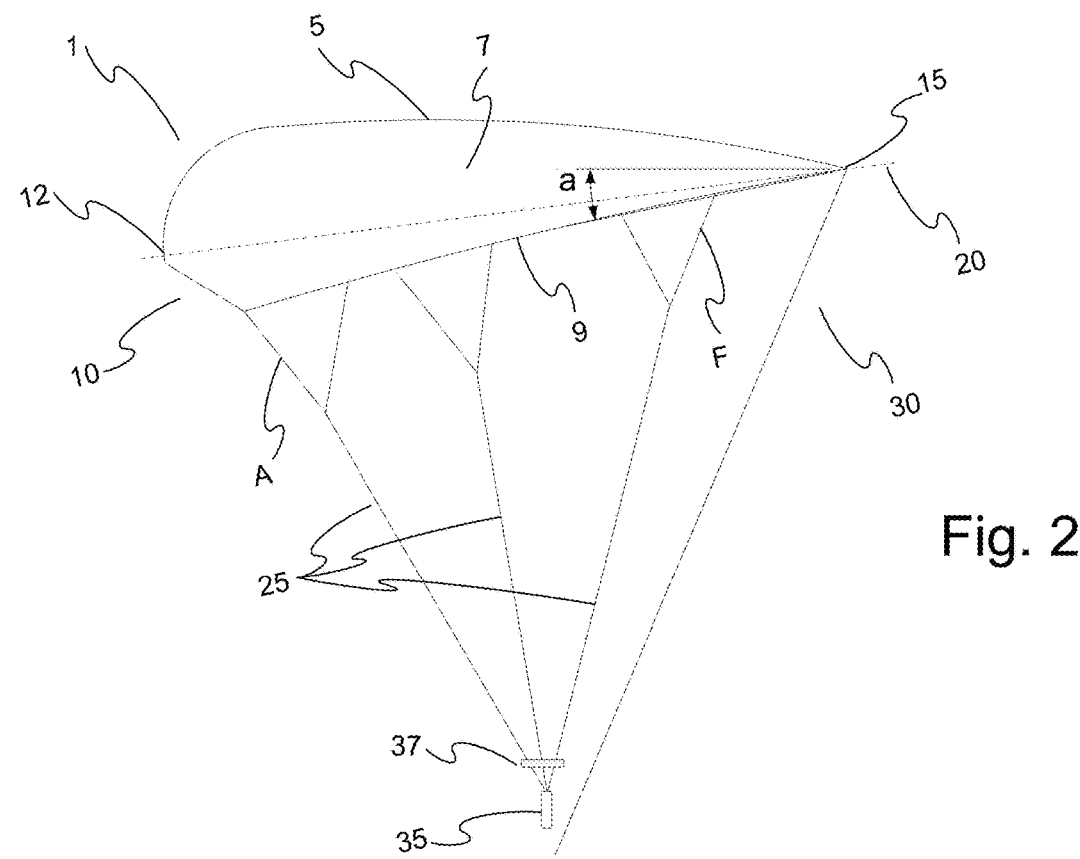
FIG. 2 depicts schematically a simplified cross-section of a wing parachute, depicting the canopy and certain lines.
Figure 3A:
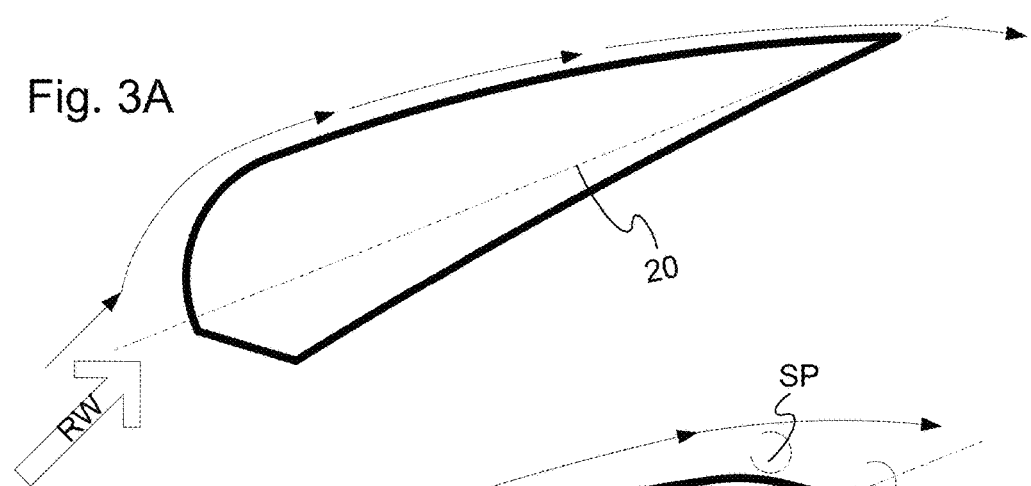
FIGS. 3A-3D depict schematically a simplified cross-section of an exemplary canopy airfoil in various stages of control line tension, with the simplified resulting airflow patterns over the top skin of the canopy.
Figure 3B:
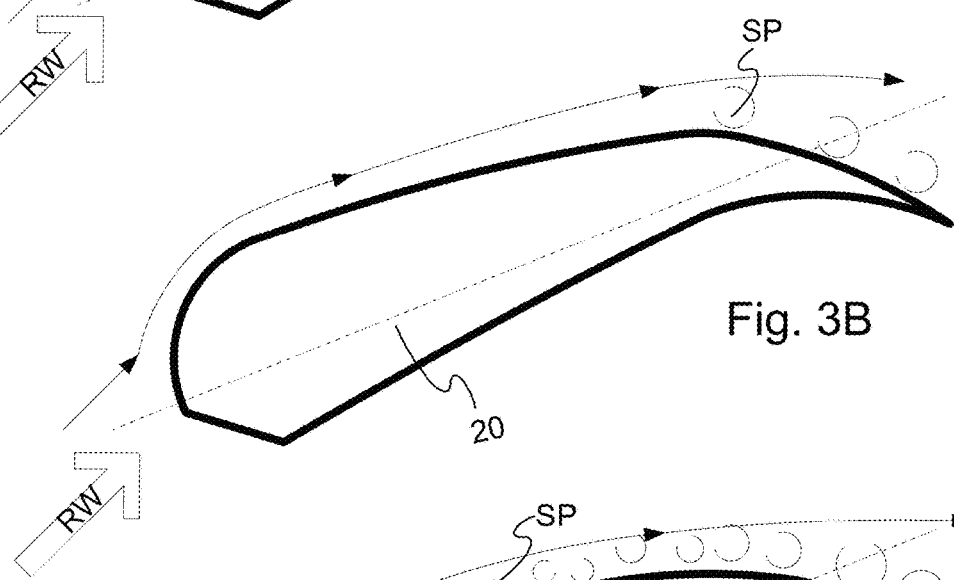
Figure 3C:
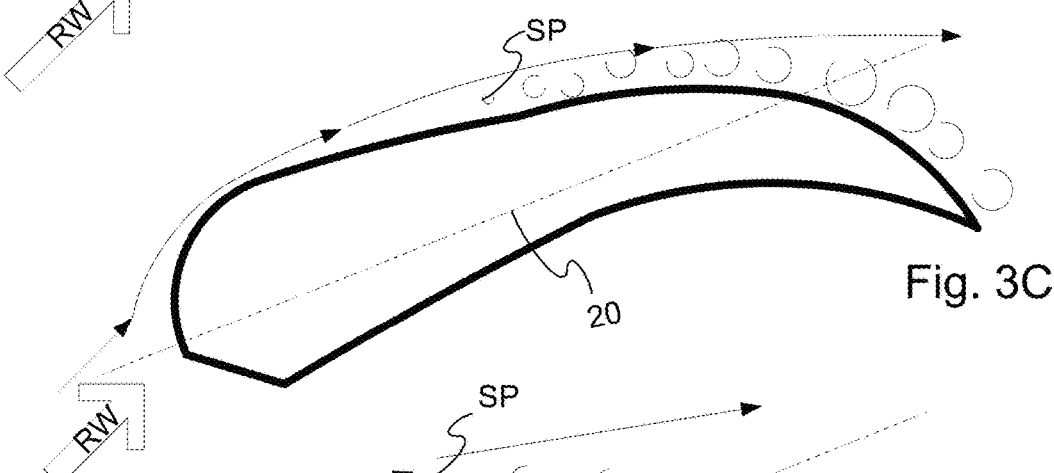
Figure 3D:
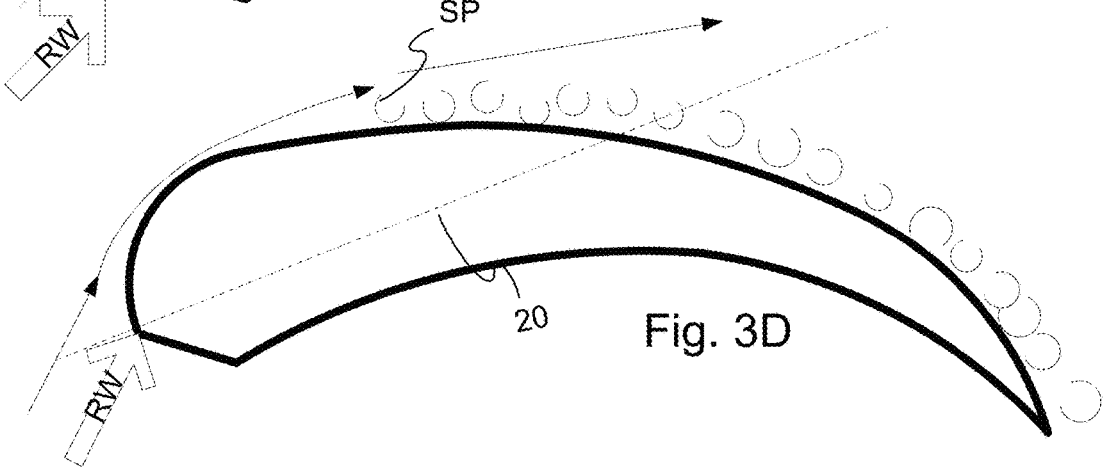

While aspects of the present invention will be described with reference to the details of the embodiments of the invention shown in the drawings (and some embodiments not shown in the drawings), these details are not intended to limit the scope of the invention.

DETAILED DESCRIPTION OF EXEMPLARY EMBODIMENTS

Embodiments of an opening shock reduction methods and mechanism will be described below, by way of exemplary illustration only. The described embodiments should not be construed as limiting the scope of different aspects and embodiments of the invention. Versions illustrating basic concept of various aspects of the invention are shown in detail in the drawings.

Figure 5:
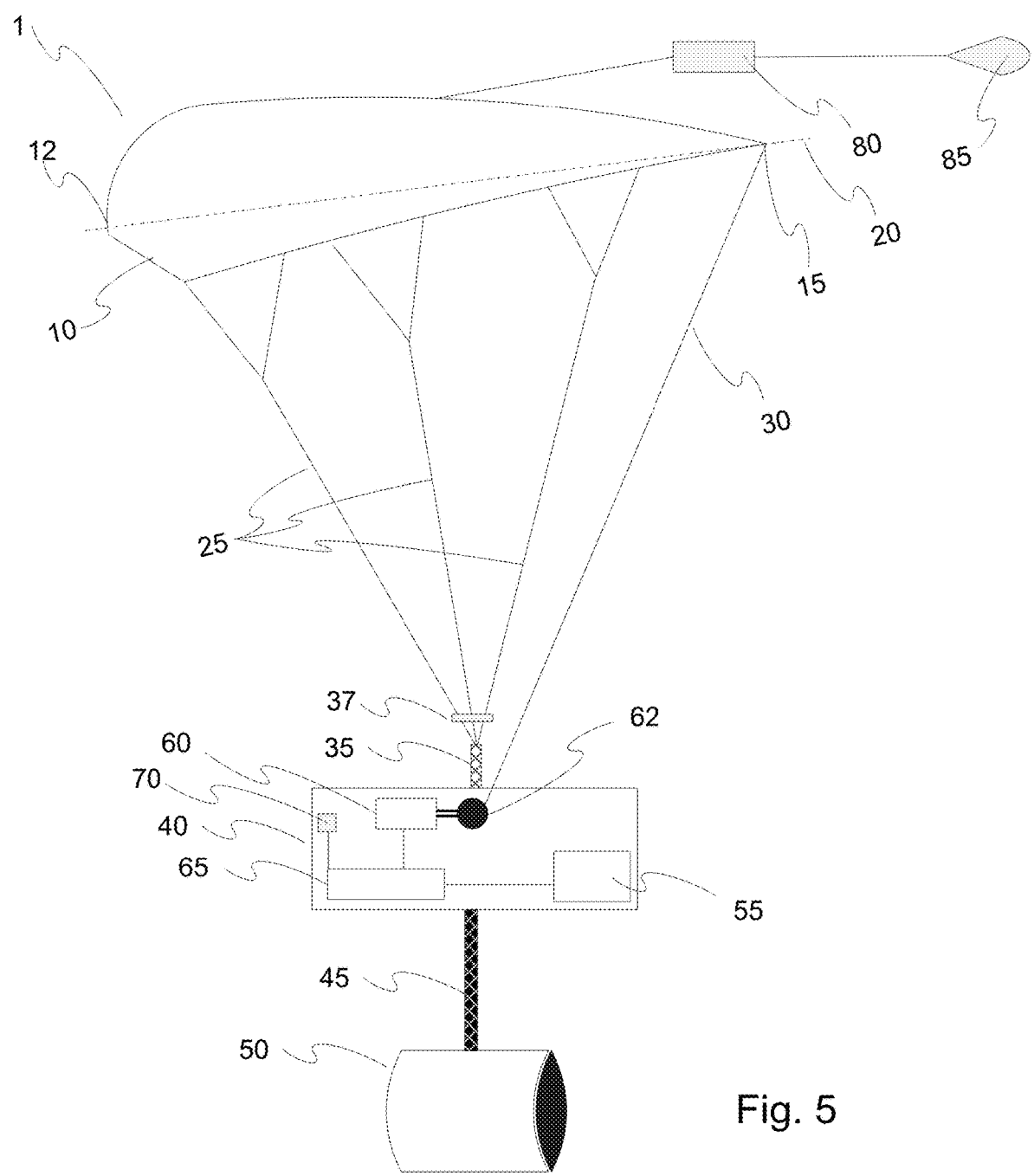
FIG. 5 depicts schematically an exemplary cargo parachute system deployed showing a platform, an actuator and other optional components.

FIG. 5 depicts schematically a left side elevation of an exemplary typical cargo parachuted assembly in a fully deployed, full flight mode. Those skilled in the art would readily recognize that while not all the components depicted in FIG. 5 are required, and that numerus devices and components may be added to the depicted configuration, FIG. 5 however shall be utilized by way of a simplified, non-limiting example to explain certain aspects and features of the present invention.

FIG. 5 depicts a chord line 20 of a neutral, full glide canopy, shown in the zero brakes state, in which the airflow above the wing is close to full laminar flow. Suspension lines 25 extend between the canopy 1 and the riser 35, which is in turn coupled to intermediate load platform 40. The payload cargo 50 is coupled to the platform 40 by a bridle known as a sling 45. The deployment bag 80 and the drogue parachute 85, as well as the slider 37 completed their intended task and are merely carried along with the parachuted assembly. Optionally, the deployment bag and the drogue may be discarded.

In FIG. 5 only the left control line 30 of the optional plurality of control lines is shown extending between the tail 15 of the left end cell and the actuator 60, however there may be a plurality of such lines on the right and/or the left side of the canopy. The right-side control line(s) coupled to the right side of the canopy is not shown, as it will be obscured by the left line in symmetrical deployment. Furthermore, oftentimes the control lines are cascaded into several lines leading from a plurality of trailing edge connecting points of one or more end cells. The depicted embodiment utilizes an actuator 60 coupled to two spools (only the left spool 62 is shown) to shorten and lengthen the respective right and left control lines 30. Each of the spools may be turned and/or held in position independently. One end of the control line 30 is coupled to the spool and the other end is coupled to the tail 15 such that turning the spool in one direction lengthen the control line length while turning the spool in the opposite direction shorten the control line length, thus controlling the steering and brake state of the respective canopy end cells. The actuator is controlled by the controller 65. Controller 65 is coupled to power supply 55. As described above, the controller and the actuator may be integrated in any desired combination, and oftentimes the division therebetween is primarily conceptual. While FIG. 5 depicts the actuator 60, power supply 55, optional sensor(s) 70 and controller 65 as housed in the intermediate load platform 40, those skilled in the art would recognize that any and all of these components may be disposed in numerous other arrangements in the parachuted assembly. A common combination of actuator and controller is known as an Autonomous Guidance Unit (AGU), which commonly includes a satellite-based positioning system, a controller, dual spool actuator, and a power source. The AGU may also serve as an intermediate cargo platform, coupling the parachute to the cargo either directly or via sling 45.

Most embodiments utilize a plurality of control lines 30 and oftentimes the control lines are also utilized as steering lines and/or brake lines. In the following example, in non-limiting manner, two control lines are coupled to respectively spanwise opposite sides of the canopy, and the same control lines may be utilized as brake and/or steering lines.

Figure 10:
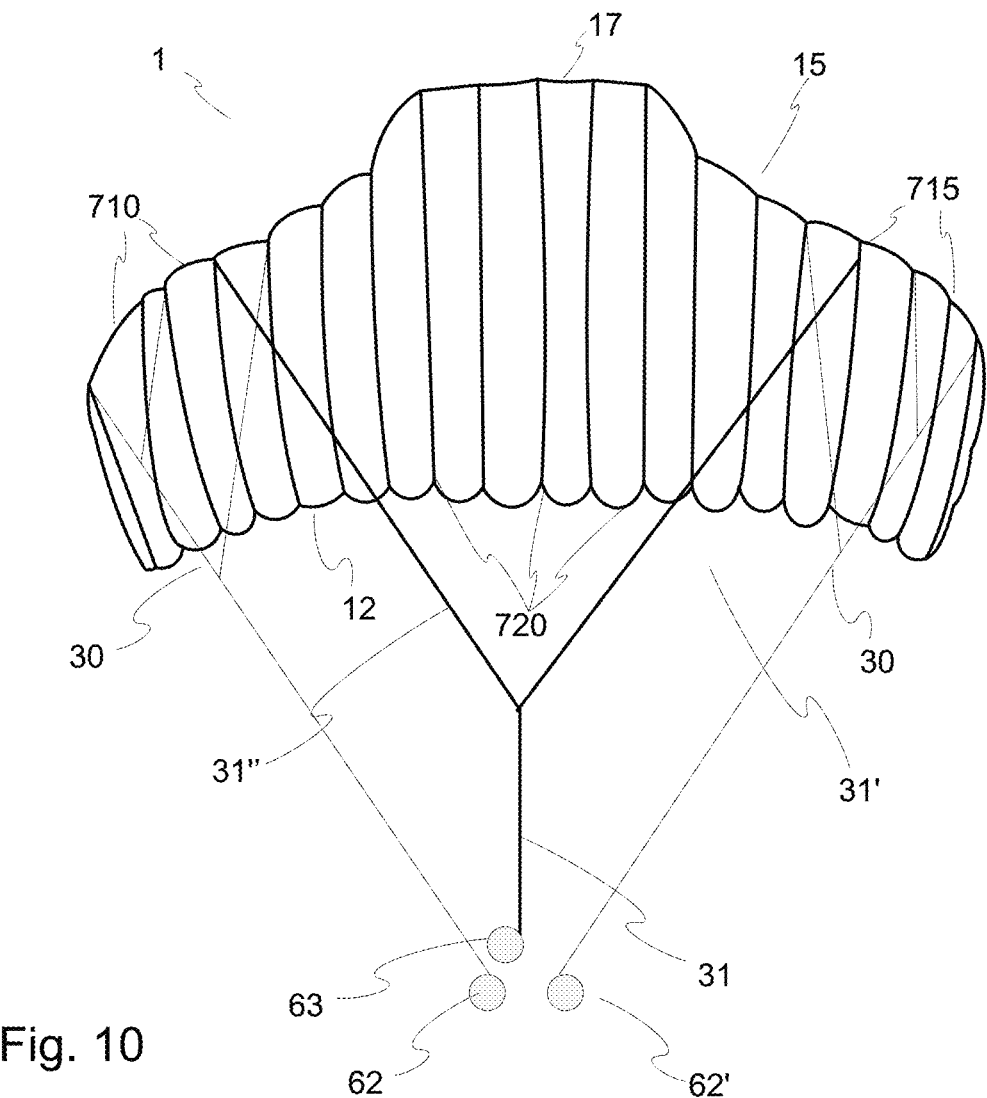
FIG. 10 depicts an optional embodiment depicting separate steering lines and braking lines.

FIG. 10 depicts an optional embodiment depicting separate steering lines 30 and braking lines 31, 31' and 31". Conceptually in this optional embodiment two brake lines 31' and 31" act as additional control lines used specifically for braking, while the control lines 30 may be utilized for steering, braking, or both, as the left control line is coupled to spool 62 and the right control line is coupled to spool 62', each spool and thereby line may be operated independently to offer steering capacity. Brake lines 31' and 31" are coupled to end cells at opposing sides of the canopy, and are operated by a separate braking actuator 63. Lines 31' and 31" may extend all the way to the braking actuator 63, or be joined at some distance from their respective end cells, as depicted by common brake line 31. spool 63 and lines 31' and 31", as well as line 31 if utilized, may be used as equivalent of control lines 30 providing symmetrical braking with a single spool 63. It is noted that lines 31' and 31" may be joined to respective control lines 30 and coupled to the cell tails thereby, or be attached to cell tails separately.

Cargo parachute canopy commonly have a large number of cells and while some drawings may depict a small number of cells, cell counts are not limited by the number of cells depicted, and numerous additional cells may be used in some embodiments. To facilitate and ease understanding, the following description shall be discussed in terms of a canopy having one end cell on each spanwise side of the canopy, a single center cell, and two intermediate cells disposed on the right and left of the center cell respectively, between the center cell and the respective end cell which is the outermost cell of the canopy. The skilled in the art would readily understand in view of the present disclosure that the principles disclosed herein are applicable regardless of the number of additional cells, that the number of end cells and intermediate cells may be modified at will as needed for design, production or mission specific parameters. Furthermore, the depicted examples utilize an intermediate load platform disposed to couple between the risers and the cargo.

The canopy is released from the deployment bag into the high velocity air stream which causes the canopy to rapidly expand from its packed form. During the inflation stage the canopy experiences chaotic stretching and contracting in numerous directions, as the high velocity air stream tosses portions of the canopy in unpredictable manner. Despite its chaotic movement during the inflation stage the canopy gradually begins filling and pressurizing with air and inflates toward the intended wing shape. As described above, during the inflation stage the canopy generally expands cord-wise faster than spanwise, and oftentimes the center cells of the span fill/pressurize faster than the end cells. When the canopy is first fully inflated the inflation stage is complete, and the parachuted assembly may begin the stable descent stage toward the ground.

A novel aspect of the invention is achieved by providing dynamic lengthening and shortening of the control lines during the inflation stage.

In an embodiment of the invention the length of the control lines 30 is set to full glide, zero brake length at the beginning of the canopy inflation period, or stated differently about the time that the canopy is released from the deployment bag. This stands in contrast to prior art parachuting practice which calls for fixed brake length substantially during the whole canopy inflation period.

Figure 6:
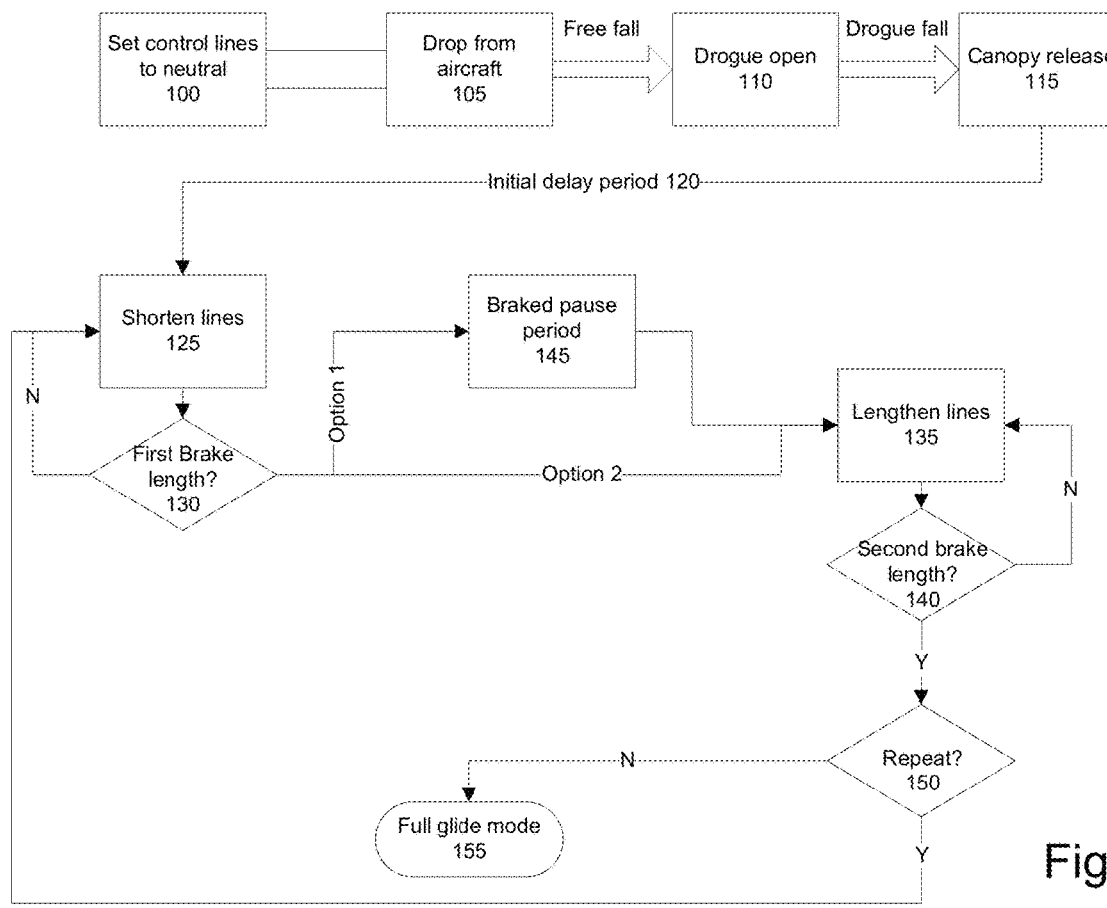
FIG. 6 is a simplified flow chart of a version of the invention.

FIG. 6 depicts schematically a simplified flow diagram followed by the controller 65 from the aircraft drop to the end of the inflation period, including certain optional features. Following the flow of FIG. 6 also enables a skilled person to exercise the method aspects of the invention. Optionally the control lines 30 initial effective length is preset 100 to substantially zero brake length during the parachute packing, or otherwise before the parachuted assembly is dropped from the delivery aircraft. Step 100 is optional, however utilizing this step eases bringing the control lines to substantially zero brake length at the canopy release stage 115. The parachute assembly is then dropped 105 from the delivery aircraft, into a freefall. Shortly thereafter the drogue parachute is deployed 110, beginning the drogue fall stage, drogue deployment may be carried out by a static line attached to the airplane or a pilot chute. After a period of drogue fall the canopy is released 115 from the deployment bag and the canopy inflation period begins. At the beginning of the canopy inflation period, the control lines length is substantially at zero brake length. While setting the effective length to zero brake length in step 100 is optional, it eases bringing the lines to substantially the zero brake length at the time of canopy release. Notably, the lines may be lengthened or shortened as needed to bring about the substantially zero brake length at the beginning of this period. Further, in some embodiments the control lines may be slightly shortened in order to initiate the canopy deployment. Notably, minor variations of the zero brake length setting at the beginning of the canopy inflation period are considered to fall within the scope of the invention and the claims. It is further noted that use of a drogue and/or pilot parachute is not necessary in all embodiments.

In the depicted flow diagram of FIG. 6 an initial delay period 120 is depicted. By way of non-limiting example, the initial delay period 120 is set to 4 seconds from the time the is canopy released from the deployment bag, however the initial delay period may be modified as required by the parachute assembly configuration and mission requirements. After the initial delay period 120, the actuator begins to shorten 125 length of the control lines 30, and continues the shortening until a predetermined first brake length is achieved 130. Determining that the first brake length is achieved may be done by calculation, such as multiplying the actuator pull rate by the pull time, pull acceleration, (spools may have variable speeds independent from the other spool), by placing an optical or electrical marker on the control line or on the actuator, by a limit switch, by an encoder which may optionally be coupled to the spool or to the control line, and the like. For the purposes of the example shown in FIG. 6, the control lines 30 are spooled for a predetermined time period, after which the controller acts as if the first brake length has been achieved. Any brake value may be selected as the first brake length, however, experiments have shown that brake length between 80% and 100% is desired in order to minimize the opening shock. In some experiments the control lines were pulled for one second achieving a first brake length of about 100%. Optionally, the initial setting of the effective length to zero brake length may be executed at any stage prior to the beginning of the canopy inflation.

Once the first brake length is reached, optionally the controller follows the path indicated by "option 1" and initiates a pause period 145 where the first brake length is maintained. Notably, some minor release during this brake period may equivalently be exercised during braked pause period 145 without departing from the scope of the invention. Once the pause period expires, execution continues to step 135.

Alternatively, the optional brake pause period 145 is not utilized, and execution continues from step 130 where the first brake length is achieved to step 135, as shown by the path marked Option 2. In steps 135 and 140 the control lines are lengthened until they achieve a second break length longer than the first brake length, and closer to zero brake length. Optionally, the second brake length may be zero brake. Once the second brake length is achieved, optionally the shortening 125 and lengthening 135 steps and optionally any intermediate steps may be repeated 150. If no repeats or no further repeats are required, the process continues to resume full glide mode 155. Notably the first and second brake lengths, and any optional delay if used, may differ between cycles.

At least the majority of the step of shortening 125 the control lines to the first brake length is performed during the inflation stage, prior to the canopy reaching the initial full inflation. However, in numerous applications the step of lengthening 135 the control lines to the second brake length is also completed during the inflation period, and potentially even any optional delay period and optional repetitions of the shortening/lengthening cycle. In certain experiments, the step of lengthening 135 was carried for one second.

Figure 4:
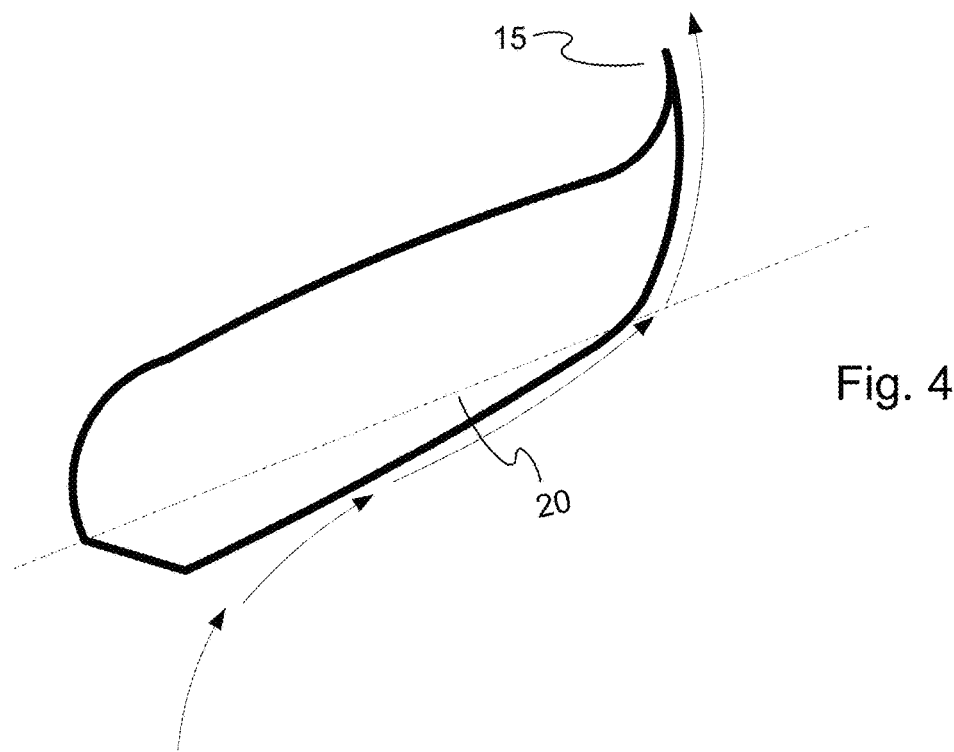
FIG. 4 depicts schematically a simplified cross section of an exemplary canopy airfoil showing the center cell(s) tail section deflected upward under moving airstream.
Figure 7:
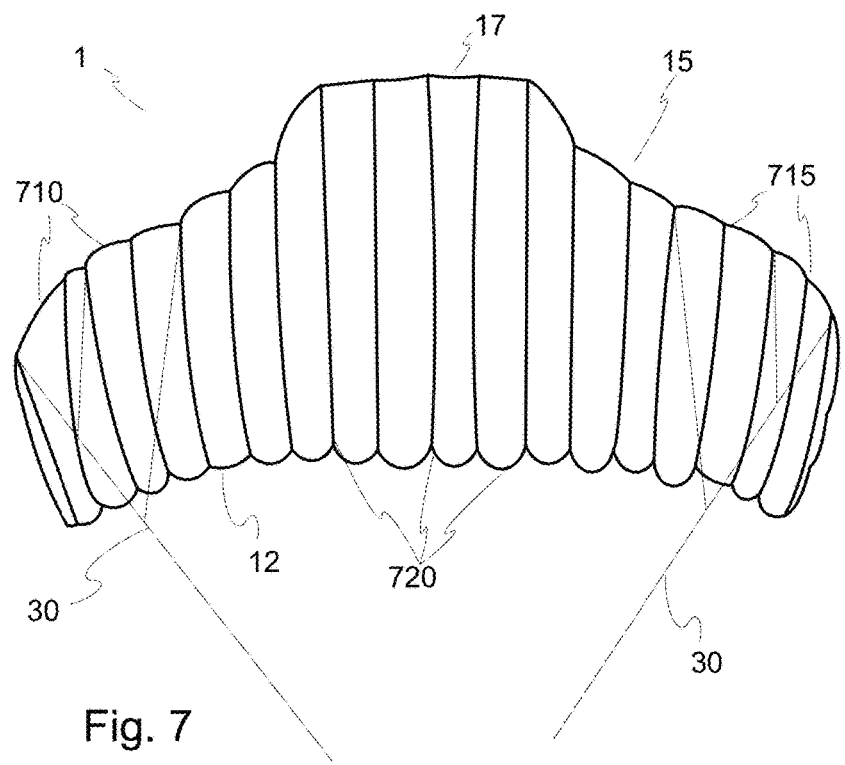
FIG. 7 depicts a simplified schematic back view of a wing parachute, canopy just about fully inflated, with the tail venting (suspension lines deleted for clarity).

FIG. 7 depicts a simplified schematic rear view of a canopy 1 during the inflation period, after partial filling of the cells, such as towards the end of the initial delay period 120, or during the first line shortening period 125. For clarity suspension lines are not shown. The control lines 30 are set to substantially zero brake length and hold the tails of left end cells 710 and right end cells 715 at the neutral, zero brake position. As depicted, the canopy had yet to acquire the full span, and the tails 15 of end cells are held essentially at the full glide position by the combination of internal air pressure, the suspension lines, and the control lines. It is noted that the center cells 720 are only held by their suspension lines, and their tails are neither held by the control lines, nor are they held by the tension of a fully developed span. Therefore, the tails of the center cells may be deflected upwards by the air collected under the lower skin 9 of the canopy. The upwardly deflected tails form a venting zone 17 which allow air trapped under the bottom skin 9 to escape upwardly. The venting effect of the venting zone 17 reduces both the effective lift of the canopy and the effective vertical drag, thus reducing the opening shock of the parachute. FIG. 4 depicts schematically a cross-section of a center cell while forming a venting zone.

Figure 8:
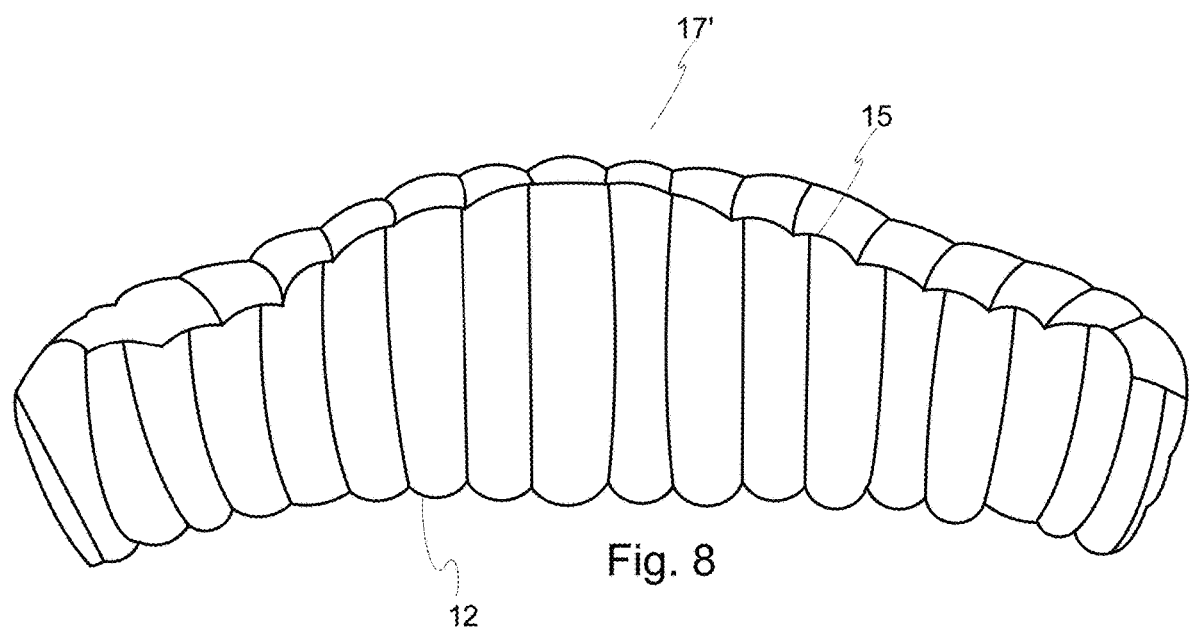
FIG. 8 depicts a simplified schematic back view of a wing parachute canopy, with brakes set at about 40%. (Suspension and control lines omitted for clarity).

FIG. 8 depicts a simplified schematic rear view of a canopy 1 during the inflation period, after further filling of the cells, and further along the shortening stage shown as 125 in FIG. 6. For clarity control and suspension lines are not shown. The control lines 30 are set to about 40% as witnessed by the downward deflection of the end cells. It is also seen that region of the tails of the center cells enumerated 17', which roughly corresponds to the venting zone 17 in FIG. 7, is now also deflected downwards, even if to a lower degree than the higher deflection imposed on the end cells by control lines 30. At the depicted state the venting through the modified vent zone 17' is significantly lower than the expansive venting which occurs at the venting region 17 of FIG. 7, if such venting exists at all. The contrast between the dynamic braking offered by beginning the inflation at zero brake which places the canopy approximately at the state of FIG. 7 and continues approximately to the state of FIG. 8 during the inflation period, and the prior art which begins and stays at a state similar to FIG. 8 until the end of the inflation period is clear. As stated above the dynamic braking may continue to any desired brake length, optionally return to zero brakes or any value therebetween, and in some embodiments even repeat the shortening and lengthening cycle through a plurality of cycles, during the inflation period.

Figure 9:
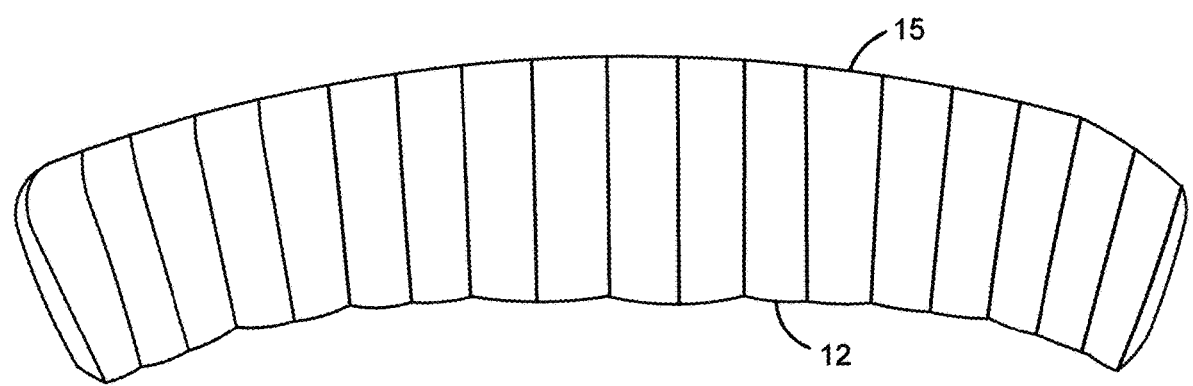
FIG. 9 depicts a simplified schematic back view of a wing parachute with the canopy in full glide mode (suspension and steering lines deleted for clarity).

FIG. 9 depicts a simplified rear view of canopy which is fully inflated and in full glide mode, after the end of the inflation stage. For clarity control and suspension lines are not shown. Once the canopy inflation is complete, the canopy cord and span are fully developed, and the control line length is again set to zero brakes, and the controller may resume full glide mode 155. Full glide mode includes guiding the parachuted assembly to the ground in controlled manner, utilizing the control lines to guide the parachute assembly, and may further include optional steps such as verifying system controllability, navigational tasks, and the like.

Guidelines for the various options and their parameters such as initial delay period 120, determining the level of the first and/or second brake length, determining rate of lengthening and/or shortening of the control lines, the pause period, and the like, is done experimentally for various combinations of cargo weight, acceptable opening shock, canopy type, size, and aspect ratio, environmental conditions, opening altitude, and the like.

The actuator may be operated by a controller local to the parachuted assembly or by a controller operated by a remote operator. The actuator may be directly or indirectly coupled to the control lines and changes to the control line length may be affected by various actuator embodiments and/or by various intermediate members. By way of example the actuator may exert force to a pulley and the control line would be coupled to the actuator via the pulley. In another example the actuator may actuate an arm that increases or decreases the tension of the control line, and thus modifies the effective length of the control line extending from the arm to the respective trailing edge. Magnetic actuators such as solenoids and the like, as well as various motors may be utilized to change the effective control line length and/or to maintain the length at a given brake position.

Minor variations of declared effective lengths, shapes, and brake states are considered to fall within accepted tolerances. It is further noted that a single control line may be rigged to achieve the desired brake effect and control the deflection of the trailing edge of both sides of the canopy by splitting the single line away from the actuator and directing each portion of the split line to opposite sides of the canopy, as shown schematically by FIG. 10. Such arrangement should be construed as equivalent to the described and claimed plurality of control lines.

Specific details are mission determined for specific requirements dictated by the like of the load weight, fragility of the cargo, liquidity of the cargo, the size/shape/aspect ratio of the canopy, environmental conditions (night drops and/or inclement weather), opening altitude and the like.

The use of a drogue parachute is common but not mandatory for the purposes of the present invention. A drogue parachute, known simply as a drogue, is commonly a drag parachute dimensioned to impart sufficient drag for initial slowing and/or limiting the vertical velocity of the load and parachute system assembly prior to deployment of the main parachute. In certain embodiments the drag of the drogue is also utilized to extract the parachute deployment bag and extend the suspension lines. In certain parachute systems a smaller parachute, referred to herein as a pilot parachute, is deployed. The pilot parachute may aid in the extraction of the drogue or may function as a drogue. The drogue and/or pilot parachute opening shock should not be confused with the main parachute opening shock as the drogue and/or pilot chute are far smaller than the main parachute, however since the system velocity is reduced in the drogue fall stage, the subsequent parachute opening shock is reduced. The use of an intermediate load platform is also not mandatory, but it does provide a stable platform for controlling the parachute and makes the cargo parachute system more modular.

In these specifications the term 'operational' and its variations (such as "operationally" by way of example), when applied to a parachute system should be construed to describe the parachute system while being dropped from an aircraft, in all of the respective stages of the transition from the aircraft to the ground.

Detailed descriptions of embodiments detailed above are provided by way of example and are not intended to limit the scope of the invention, or aspects thereof. Furthermore, not all of features, elements and/or limitations described are required in all embodiments of the invention.

Notably, certain features which are described in the context of separate embodiments may be combined in a single embodiment, and that various disclosed features which are described as a single embodiment, provided in any subcombination. Features described in the context of various embodiments are not to be considered essential features of those embodiments, unless the respective embodiment is inoperative without those elements.

Versions of the invention may be made with any and all suitable materials desired as needed for the appropriate use and the invention and embodiments thereof are not limited by the type of materials used in implementing thereof. Versions are scalable and may be made any suitable size. Versions of the invention may be retrofitted to existing (used) conventional parachute cargo systems, canopy systems, and the like, and/or manufactured as new systems.

The term lines encompass actual lines—ropes, cables, wires, cords, webbing, and the like, group or groups of lines, such as a plurality of separate lines, as well as rods, shackles, eyelets, hooks, links, and the like. Any combination of lines and extensions thereof such as shackles, eyelets, and the like should be construed as the line itself.

Notably, whenever the term 'and/or' is used in these specifications and the attached claims, it should be construed as any number, combination or permutation of all, one, some, a plurality or none of each of the item or list mentioned. It is also understood that (s) designates either singular or plural. The use of the terms "a" and "an" and "the" and similar references in the in the context of describing embodiments are to be construed to cover both the singular and plural, unless otherwise indicated herein or clearly contradicted by context. Similarly, elements which are known in the art or described as having the option of being singular or plural should be construed to cover both the singular and the plural, unless otherwise indicated herein or clearly contradicted by context. It is further understood that that "or" is an inclusive "or" to include all items in a list and not intended to be limiting and means any number, combination or permutation of all, one or plurality of each of the item or list mentioned, unless the term 'or' is explicitly defined as exclusive, or if the context would clearly indicate an exclusive or to the skilled artisan. It is also understood that "include(s)" and/or "including" means "including but not limited to" any number, combination or permutation of all, one or plurality of each of the item or list mentioned.

Although the foregoing invention has been described in detail by way of illustration and example, it will be understood that the present invention is not limited to the particular description and specific embodiments described but may comprise any combination of the above disclosed elements and their equivalents and variations thereof, many of which will be obvious to those skilled in the art in view of the present disclosure, and the invention extends to such variations.

The invention claimed is:

1. A method of parachuting cargo utilizing a parachute system operationally having a flexible wing shaped canopy, the canopy having a plurality of laterally arranged ram air inflated cells extending from a leading edge to a trailing edge and forming an airfoil, the canopy having a plurality of suspension lines and at least a left and right control line configured to controllably modify the airfoil shape of one or more respective left and right end cells, the control lines effective length being controllable by an actuator at a range at least between zero brake (0%) length and full brake (100%) length, the method comprising:
dropping the parachuted system from a delivery aircraft with the canopy packed in a deployment bag;
releasing the canopy from the deployment bag to initiate the canopy inflation the control lines length being substantially at 0% brake length at the time of releasing the canopy; and,
utilizing the actuator, shortening the effective length of the control lines from 0% brake length to a pre-determined first brake length during the canopy inflation period, the canopy inflation period beginning after the step of releasing and ending upon full inflation of the canopy.

2. A method as claimed in claim 1 further comprising a pause between the shortening and the lengthening of the control lines.

3. A method as claimed in claim 1, further comprising lengthening the control lines to a second brake length after the shortening step and during the canopy inflation period.

4. A method as claimed in claim 1 wherein the parachute system comprises a controller configured to control the actuator, and at least one sensor, the at least one sensor being in data communication with the controller, the method further comprising the step of sensing by the sensor at least one parameter relating to the status of the parachute system, and utilizing the sensed parameter for controlling the control lines so as to maintain the canopy at or about pre-stalled condition during at least a portion of the canopy inflation period.

5. A method as claimed in claim 4, wherein the at least one parameter is selected from angle of attack, air velocity, altitude, canopy shape, canopy distortion, G force, lateral velocity, canopy stress, air pressure, and any combination thereof.

6. A method as claimed in claim 1, wherein the step of shortening occurs after a delay from the step of releasing the canopy.

7. A method as claimed in claim 1, further comprising performing a plurality of cycles after the step of lengthening, each cycle comprising a shortening and a lengthening of at least one of the left and right control lines, at least one cycle occurring during the canopy inflation period.

8. The method as claimed in claim 1, wherein the first brake length is between 50% brake and 100% brake.

9. The method as claimed in claim 1, wherein the first brake length is 100% brake.

10. The method as claimed in claim 1, wherein the step of shortening begins after a delay from the time of the step of releasing, and wherein during this delay the trailing edge of at least one of the plurality of cells disposed between the left and right end cells is diverted upwardly to form a venting zone allowing air trapped under the canopy to vent.

11. A cargo parachute system with reduced parachute opening shock the cargo parachute system comprising:
an inflatable wing-parachute canopy, operationally having a span and a substantially orthogonal cord, the canopy comprising at least three spanwise coupled cells, forming at least one center cell at least one left end cell and at least one right end cell, the respective end cells disposed respectively on opposing sides of the at least one center cell, each cell of the at least three cells having a leading edge and a trailing edge;
an actuator;
a right control line coupled between the actuator and the trailing edge of at least one right end cell;
A left control line coupled between the actuator and trailing edge of at least one left end cell;
the actuator being constructed to dynamically control the effective length of the left and/or right control lines between lengths corresponding to zero brake state and full brake state respectively;
a controller coupled to the actuator, the controller being configured to operationally control the actuator to shorten the effective length of at least one of the left and right control lines to a pre-determined first brake length during a canopy inflation period, the canopy inflation period beginning after the canopy is operational released from a deployment bag, and ending upon full inflation of the canopy.

12. A system as claimed in claim 11, wherein the controller comprises a guidance system.

13. A system as claimed in claim 12, wherein the guidance system comprises a satellite navigation guidance system.

14. A system as claimed in claim 11, wherein the controller is being configured to control the actuator to operationally lengthen the effective length of at least one of the control lines to a pre-determined second brake length during the inflation stage of the canopy, wherein the lengthening occurs subsequent to the shortening.

15. A system as claimed in claim 14, wherein the controller is being configured to operationally pause between the shortening and the lengthening during the inflation stage of the canopy.

16. A system as claimed in claim 15, wherein the shortening and lengthening of the control line is controlled in accordance with a predetermined time schedule.

17. A system as claimed in claim 11, wherein the controller and the actuator are integrated.

18. A system as claimed in claim 11, further comprising an Autonomous Guidance Unit (AGU) and wherein the controller, the actuator and a satellite guidance are integrated within the AGU.

19. A system as claimed in claim 11, further comprising at least one sensor in data communication with the controller, and wherein the controller is configured to control the length of at least one of the control lines in response to data received from the sensor.

20. A system as claimed in claim 19, wherein the sensor is selected from an angle of attack sensor, an air velocity sensor, an altitude sensor, a canopy shape sensor, a canopy distortion sensor, a G force sensor, a lateral velocity sensor, a canopy stress sensor, an air pressure sensor, and any combination thereof.

21. A system as claimed in claim in claim 19, wherein the sensor comprises a camera operationally aimed at the canopy.

22. A system as claimed in claim 14, wherein the controller is being configured to cyclically shorten and lengthen the control lines during the inflation stage of the canopy.

23. A system as claimed in claim 22 wherein the cycle occurs in accordance to a timing schedule.

24. A method of parachuting cargo utilizing a parachute system operationally having a flexible wing shaped canopy, the canopy having a plurality of laterally arranged ram air inflated cells extending from a leading edge to a trailing edge and forming an airfoil, the canopy having a plurality of suspension lines and at least a left and right control line configured to controllably modify the airfoil shape of one or more respective left and right end cells, the control lines effective length being controllable by an actuator at a range at least between zero brake (0%) length and full brake (100%) length, the method comprising:
dropping the parachuted system from a delivery aircraft with the canopy packed in a deployment bag;
releasing the canopy from the deployment bag to initiate the canopy inflation stage; and,
utilizing the actuator, dynamically modifying the control lines effective length during an inflation time period, the inflation time period begins after the step of releasing and ends upon full inflation of the canopy.

25. A method as claimed in claim 24, wherein the parachute system comprises a controller configured to control the actuator and at least one sensor, the at least one sensor being in data communication with the controller, the method further comprising the step of sensing by the sensor at least one parameter relating to the status of the parachute system, and utilizing the sensed parameter for controlling the control line, so as to maintain the canopy at or about full brake condition during at least a portion of an inflation time period, the inflation time period begins after the step of releasing and ends upon full inflation of the canopy.

26. A method of parachuting cargo utilizing a parachute system operationally having a flexible wing shaped canopy, the canopy having a plurality of laterally arranged ram air inflated cells extending from a leading edge to a trailing edge and forming an airfoil, the canopy having a plurality of suspension lines and at least a left and right control line configured to controllably modify the airfoil shape of one or more respective left and right end cells, the control lines effective length being controllable by an actuator at a range at least between zero brake (0%) length and full brake (100%) length, the method comprising:
dropping the parachuted system from a delivery aircraft with the canopy packed in a deployment bag;
releasing the canopy from the deployment bag to initiate the canopy inflation stage; and,
applying dynamic braking to the control lines during at least a portion of the canopy inflation period, which period begins after the step of releasing and ends upon full inflation of the canopy.

* * * * *